J. T. COMPTON.
RAT TRAP.
APPLICATION FILED DEC. 7, 1920.

1,435,806.

Patented Nov. 14, 1922.
2 SHEETS—SHEET 1.

Inventor
J. T. Compton
By
G. Hume Talbert
Attorney

J. T. COMPTON.
RAT TRAP.
APPLICATION FILED DEC. 7, 1920.

1,435,806.

Patented Nov. 14, 1922.

Inventor
J. T. Compton,
By
Attorney

Patented Nov. 14, 1922.

1,435,806

UNITED STATES PATENT OFFICE.

JOHN T. COMPTON, OF SEABROOK, TEXAS.

RAT TRAP.

Application filed December 7, 1920. Serial No. 428,912.

*To all whom it may concern:*

Be it known that I, JOHN T. COMPTON, a citizen of the United States of America, residing at Seabrook, in the county of Harris and State of Texas, have invented new and useful Improvements in Rat Traps, of which the following is a specification.

The object of the invention is to provide a trap for rats and similar rodents and other small animals wherein the construction is such as to cause the animals upon being caught to pass into a receptacle or chamber remote from the trap entrance so as to remove from the entrance of the trap or the portions thereof adjacent to the entrance all evidence of the presence of the trapped animal which otherwise has the tendency of deterring other like animals from approaching the structure, and furthermore to provide for conducting the trapped animal if desired to a point where it may be discharged into a sewer or water receptacle or otherwise disposed of, and in that connection to provide means whereby members or compartments of the trap may readily be disconnected or disassembled for cleansing purposes or for transportation or storage; and with these objects in view the invention consists in a construction and combination of parts of which a preferred embodiment is shown in the drawing, wherein—

Figure 1:
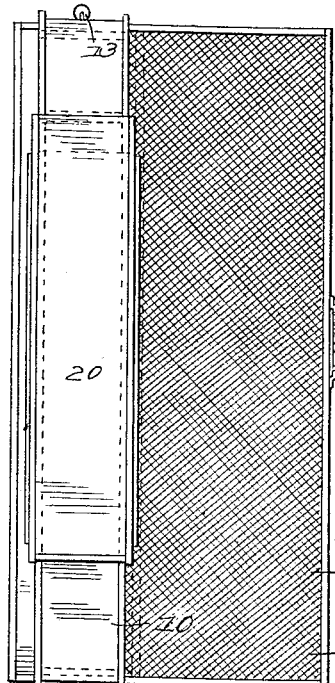
Figure 1 is a plan view of the trap.
Figure 1:
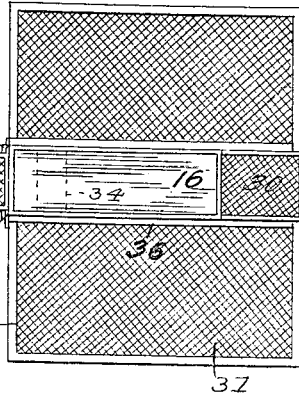

The trap embodies essentially a run-way 10 having a bottom or floor consisting of the tilting trap doors 11 counterweighted as at 13 to yieldingly hold the same in their normal or horizontal positions, a receiving chamber 14 in which the animals are deposited by the downward tilting of the trap doors, a lead 15 communicating at one end with the receiving chamber and designed to form a path of escape therefrom, and a second or supplemental run-way 16 in communication with the other end of the lead and having its bottom formed by a trap door 17 also counterweighted as indicated at 18 and serving to deposit the animals in a confining chamber 18' which may be provided with a removable floor or bottom 19 to permit of communication with a sewer or water containing receptacle or other means of finally disposing of the entrapped animal.

In the construction illustrated the primary run-way 10 forming the entrance to the trap is provided in its top with a pivotal lid or cover 20 from which is suspended a bait holder 21 so as to dispose the bait at or about the center of the length of the run-way over the free edges of the trap doors 11 of which a pair preferably is used, and extending transversely of the run-way between the open ends thereof and the plane of the bait holder, and for example above and slightly inward of the pivots 22 of said trap doors, are revoluble barriers 23 consisting of rollers designed to intercept the approach of an animal to the bait to an extent sufficient to induce the latter to mount the barrier as a perch and which by reason of its revoluble mounting serves as the animal reaches forward or inwardly from the same to turn and deposit the animal with some force upon the free ends of the trap doors so that the effective depression of the free ends thereof, and hence the deposit of the animal in the receiving chamber is insured.

Figure 2:
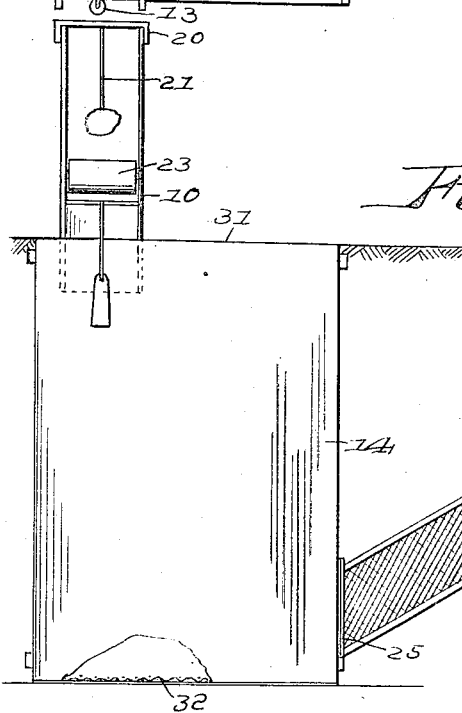
Figure 2 is an end view partly in section of the same.
Figure 2:
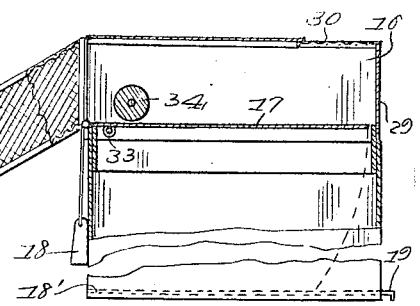
Figure 3:
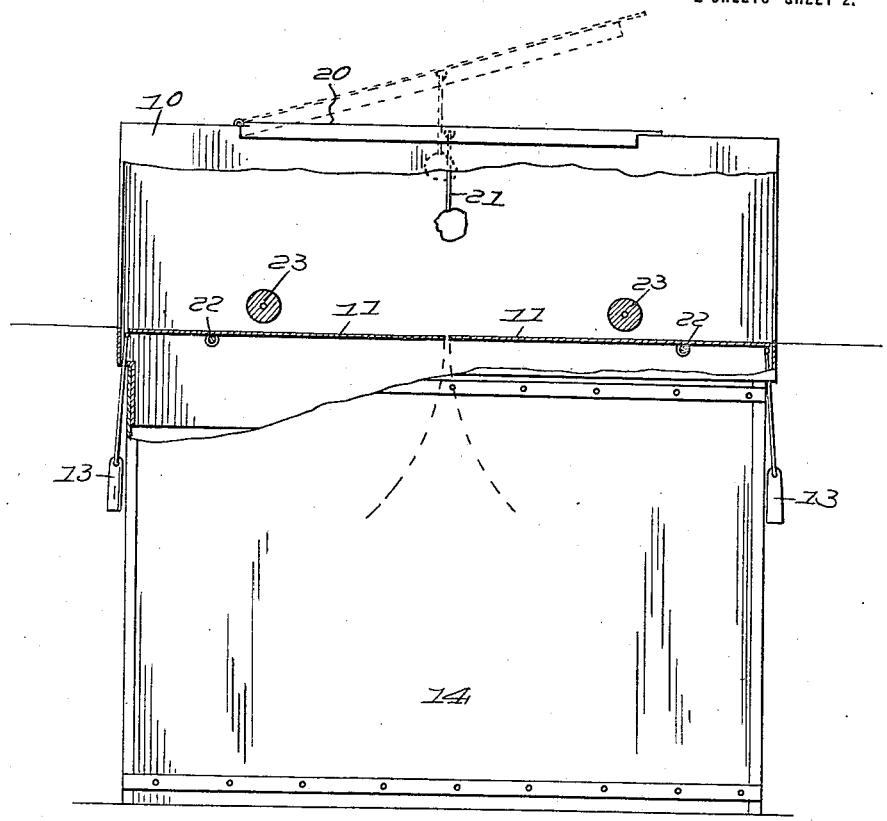
Figure 3 is a side view partly in section.
Figure 4:
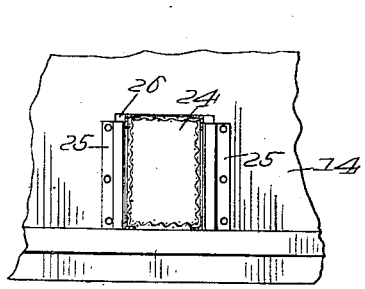
Figure 4 is a detail elevational view showing the detachable connection between the lead and the receiving chamber.
Figure 5:
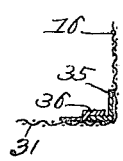
Figure 5 is a detail sectional view showing the detachable connection between the second run-way and the confining chamber.

The lead 15 is preferably disposed in an upwardly inclined or oblique position as indicated in Figure 2 with a detachable engagement between the lower end thereof and the wall of the receiving chamber adjacent to the opening 24 with which it communicates, such detachable connection consisting of the slides or cleats 25 for engagement by flanges 26 at the sides of the lead, and a similar engagement consisting of flanges 27 and guides or cleats 28 is provided between the upper end of the lead and one end of the run-way 16, the opposite end of said run-way being closed by a wall 29 adjacent to which the top of the run-way is provided with a screen 30 to admit light as also is the top of the receiving chamber as shown at 31. The bottom of the receiving chamber may consist of a screen as indicated at 32.

The secondary or auxiliary run-way 16 adjacent to the plane of the pivot 33 of the trap door 17 may also as shown be provided with a revoluble barrier consisting of a roller 34 for a purpose similar to that described in connection with the barriers employed in the main or entrance run-way 10, namely to form an unstable footing for the animal in passing thereover and insure a sufficient impact with the trap door to cause the depression of the latter to precipitate the animal into the receptacle 18. Also preferably the run-way 16 is removably attached to the chamber 18' by a sliding connection consisting of flanges 35 engaging guides or grooves 36. In the construction illustrated the top of the lead 15 is fitted with a screen 37 with the object of inducing the animal deposited in the chamber 14 to follow the lead into the chamber 18 which, being remote from the receiving chamber and the entrance run-way, removes the odor of the animal which therefore does not serve as a means of deterring other animals from entering the trap.

In operation the rodent is enticed to enter the entrance runway 10 seeking the bait. Stepping upon one or the other of the rollers 23, depending from which side he enters the runway he is precipitated on one of the doors 11 which giving under his weight, causes him to be thrown into the receiving chamber 14 from which he is induced to pass up the lead 15 to the runway 16 where, stepping on the roller 34, he is precipitated into the confining chamber 18' as the trap door 17 gives under his weight. From the confining chamber he may be removed by the operation of the removable floor or bottom 19, so that he may finally be disposed of in a sewer or water containing receptacle or the like.

Having described the invention, what is claimed as new and useful is:—

A trap having an open ended entrance run-way provided in its floor with counter-weighted trap doors, a receiving chamber located beneath said run-way and accessible by depression of the trap doors, a confining chamber, a run-way superposed on the confining chamber and having a depressible trap door by which communication is effected with the latter, the confining chamber being provided on its top with spaced guides, and the last named run-way having flanges slidably engaging said guides to provide a detachable connection between the last named run-way and the confining chamber, and an inclined lead detachably engaged, both with the receiving chamber and with the last named run-way, both of said detachable connections consisting of cleats disposed respectively on the receiving chamber and the last named run-way and flanges carried by the leads and slidably engaging behind said cleats.

In testimony whereof he affixes his signature.

JOHN T. COMPTON.